J. L. WHEELER.
ZERO SETTING MECHANISM FOR MEASURING MACHINES.
APPLICATION FILED JULY 14, 1919.
1,390,323.
Patented Sept. 13, 1921.
3 SHEETS—SHEET 1.
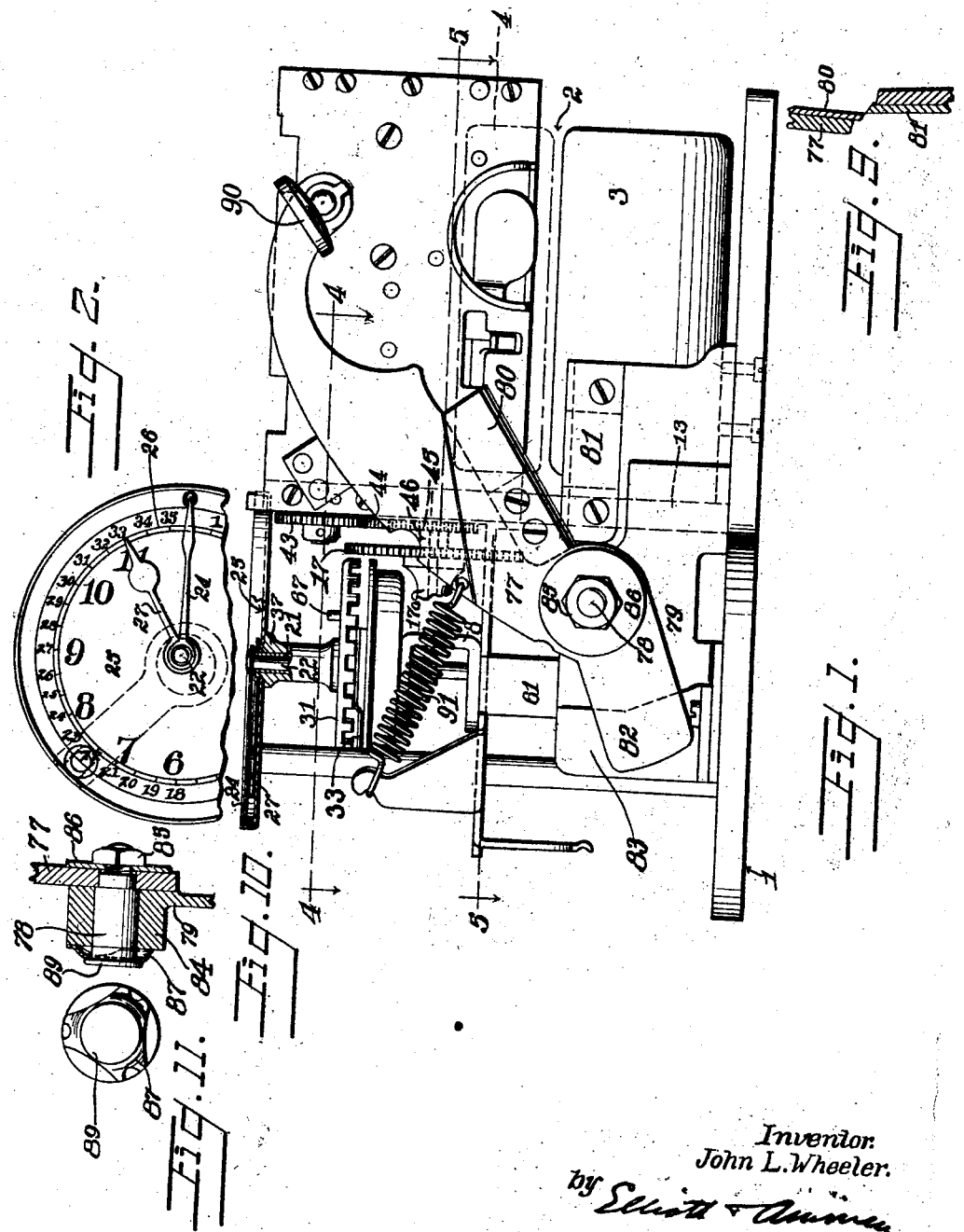
Inventor.
John L. Wheeler.
by Elliott & Ammen
his Atty's.

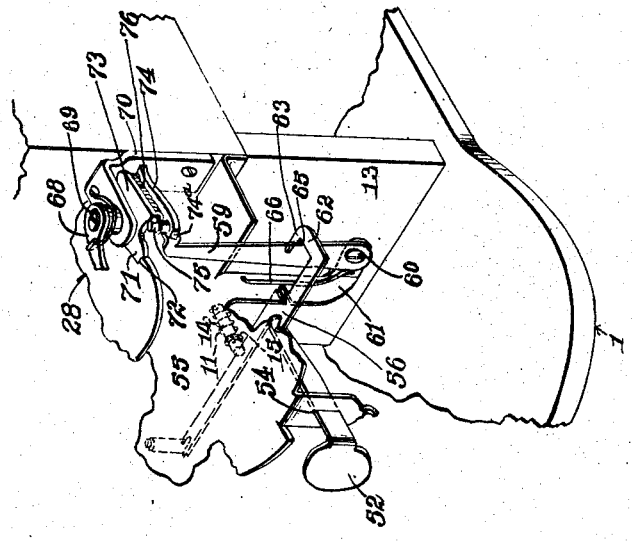

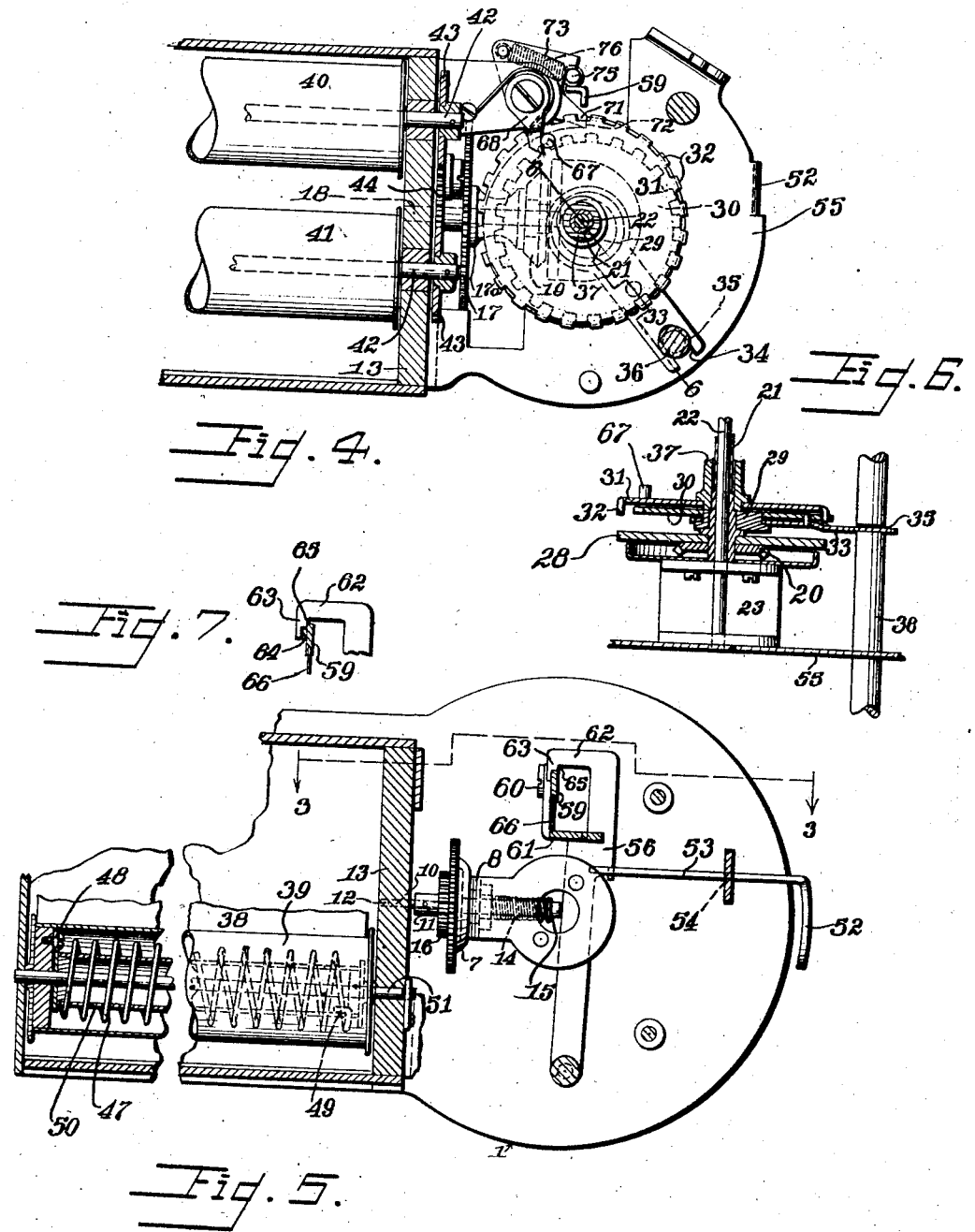

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION.

ZERO-SETTING MECHANISM FOR MEASURING-MACHINES.

1,390,323.

Specification of Letters Patent. Patented Sept. 13, 1921.

Application filed July 14, 1919. Serial No. 310,753.

*To all whom it may concern:*

Be it known that I, JOHN L. WHEELER, a citizen of the United States, residing in the city of St. Louis, State of Missouri, have invented new and useful Improvements in Zero-Setting Mechanism for Measuring-Machines, of which the following is a specification.

This invention relates to fabric measuring and cost computing machines, though many features of the invention are applicable to machines for other specific purposes. Machines of this type usually include a measuring roller, over which the fabric is pulled in being measured, the rotation of the roller being imparted to indicating mechanism which indicates the amount of fabric measured, and the cost of the same. After each measuring operation it is necessary to return the indicating mechanism to the zero position, and this has been accomplished by disengaging certain gears of the driving train through which the indicating mechanism is driven; while the drive is disconnected in this way the indicating mechanism is automatically returned to its zero position. Where this disconnection is effected in the driving train, in this way, it sometimes happens that when the separated gears come together, they will not mesh correctly, and this might result in an inaccuracy in measurements, or in a temporary locking of the mechanism.

One of the objects of the present invention is to provide very simple means for effecting the disconnection in the drive from the measuring roller to the indicating mechanism, and also to provide means for insuring that the disconnection is maintained until the indicating mechanism has completed its return movement to the zero position. This is preferably effected by automatic means which holds the driving train open, but automatically closes the driving train after the indicating mechanism has completed its return movement to the zero position. Machines of this type also usually include indicating devices such as pointers or hands which rotate adjacent to an indicating dial; one of the pointers is a slow-moving pointer indicating yards, and the other is a fast-moving pointer indicating inches or fractions of yards.

Further objects of the invention will appear hereinafter.

The invention consists in the novel features, and in the general combination of parts to be particularly described hereinafter, all of which contribute to produce a simple and efficient fabric measuring and cost computing machine. A preferred embodiment of my invention will be particularly described in the following specification, while the broad scope of my invention will be pointed out in the appended claims.

In the drawing,

Figure 1 is a side elevation and partial section of the mechanism of the machine with the casing removed;

Fig. 2 is a plan showing a portion of the dial of the machine;

Fig. 3 is a vertical section, certain parts being broken away; this section is taken about on the line 3—3 of Fig. 5;

Fig. 4 is a horizontal section taken about on the line 4—4 of Fig. 1;

Fig. 5 is a horizontal section taken about on the line 5—5 of Fig. 1;

Fig. 6 is a section taken about on the line 6—6 of Fig. 4 and showing details;

Fig. 7 is a fragmentary plan illustrating details of the mechanism for holding the drive open;

Fig. 8 is a perspective, certain parts being broken away, and particularly illustrating the mechanism for disconnecting the drive of the indicating mechanism;

Fig. 9 is a vertical section indicating the manner in which the blades of the cutter come together;

Fig. 10 is a vertical section at the fulcrum of the movable knife; and

Fig. 11 is a side elevation illustrating the pivot-stud of the movable knife, and showing contiguous parts.

The machine to which I have applied my invention comprises a frame including a base-plate 1, the mechanism of the machine being inclosed within a case which is not illustrated. The fabric, in being measured, is pulled through a gap or throat 2 between the measuring roller 3, and a presser roller 4 indicated by the dotted outline. In Fig. 1, the presser roller 4 is represented as slightly elevated above the face of the measuring roller, but when the machine is measuring, it presses the fabric against the face of the measuring roller.

I provide indicating mechanism which preferably includes means for indicating the amount of fabric measured, and also means for indicating the cost of the measured piece. The portion of the indicating mechanism which indicates the length of the goods measured will now be described, and in doing so, I shall describe the means which I prefer to provide for disconnecting the drive from the measuring roller to the indicating mechanism.

The shaft 5 of the measuring roller carries a rigid pinion 6, which drives the indicating mechanism through a clutch which can be opened at will by a hand-operated part. The clutch is preferably provided with means for normally holding it closed, and in the present instance is controlled by a stem mounted to slide on the axis of rotation of the clutch.

Refering to Fig. 3, the pinion 6 meshes with and drives a gear wheel 7, the hub of which is rotatably mounted in a fixed bracket 8, and the inner face of this gear wheel 7 is dished so as to enable it to operate as a clutch member coöperating with a second clutch member in the form of a friction disk 9 which is attached to a stem 10 mounted to slide on the axis of the clutch, said stem being provided with a collar 11 which enables the clutch disk 9 to be pressed firmly aginst the gear wheel 7. The inner end of the stem 10 is mounted to slide in a guide-bore 12 in a vertical frame-plate 13, and the outer end of the stem 10 is enlarged and carries a coil-spring 14 which thrusts against a collar 15, (see Fig. 5), on the outer end of the stem. Evidently the spring always tends to close the clutch and it normally does hold the clutch closed.

The hub of the clutch-disk 9 carries a rigid pinion 16 which drives a large gear 17, said gear being mounted rotatably on a fixed arbor 18 and carrying a hub 17ª with a bevel gear 19 secured to its inner end. This bevel gear meshes with a bevel gear 20, see Fig. 3, which is rigidly attached to a vertical hollow spindle 21, see Fig. 6, which rotates about a fixed vertical arbor or pin 22 which extends up from a pedestal bracket 23. The upper end of the hollow spindle 21 carries a fast-moving pointer or hand 24, see Fig. 2, which rotates adjacent to the dial 25, said dial being provided with a scale 26, the divisions of which are numbered from zero to thirty-six, and this dial also carries numbers from one to eleven indicating yards and giving the machine a capacity of twelve yards. The slow-moving hand or pointer 27 is driven by any rotatable part of the mechanism that rotates in unison with the fast-moving pointer 24. The spindle 21 may be considered the rotatable member. Rigid with the tubular spindle 21 I provide a stop-wheel 28.

I provide reduction gearing between the rotatable member 21 and the pointer 27, operating in such a way that the pointer 27 will be driven at reduced speed, and so that it will move through one indicated yard on the scale while the pointer 24 is making a complete revolution. I provide very simple means for effecting this reduction of movement, thereby avoiding the necessity for employing a large number of gears and pinions to effect this reduction.

In order to accomplish this, I provide the spindle 21 (which rotates in unison with the fast-moving, or inch pointer) with a rigid eccentric 29, (see Figs. 4 and 6) and this eccentric is mounted to rotate freely within a small gear wheel 30 so that the small gear acts as the "strap" for the eccentric. The small gear lies adjacent to the underside of a large gear wheel 31, in the form of a crown wheel with its edge bent down to form gear teeth 32 with which the teeth of the small gear 30 mesh. I also provide means for preventing the small gear 30 from rotating; with this organization of parts, it is evident that at every revolution of the eccentric, the large gear wheel 31 will be rotated through a partial revolution. The diameters of the gears 31 and 30 are so related to each other that the large gear wheel will move at one-twelfth of the speed of the small gear wheel.

I prefer to hold the small gear wheel 30 against rotation by guiding it on a part of the frame, and in order to accomplish this, I simply attach a radial bar 33 to its underside and provide the outer end of the bar with a U-slot 34, which engages a reduced neck 35 formed on a frame-post 36, see Figs. 4 and 6. The large wheel or crown wheel 31 carries a large tubular spindle 37, the upper end of which projects through the dial 25 and carries the slow-moving pointer or hand 27.

I prefer to provide charts such as the chart 38, and these charts are normally wrapped upon a roller or drum 39, see Figs. 3 and 5, the two charts or webs being attached, respectively, to rollers 40 and 41, see Fig. 4. I do not claim any novelty in the arrangement of these rollers; their arrangement is substantially the same as that shown in Patent No. 1,288,002 to W. E. Hosch, deceased, of December 17, 1918. These rollers 40 and 41 are positioned so that their upper faces lie adjacent to a fixed scale with which the numbers on the charts coöperate, to indicate the cost of the length of fabric measured.

In order to enable the rollers 40 and 41 to be driven, each roller carries a rigid shaft 42 carrying a pinion 43, and these pinions are driven by an idle gear 44 located between and below them, said idle gear being driven by a gear wheel 45 carried on a tubular extension 46 which extends from the hub 17ᵃ and carries the aforesaid gear 17, see Figs. 1 and 3.

Any suitable means may be provided for returning the indicating mechanism to the zero position, when the clutch, composed of the clutch members 7 and 9, has been opened. This means is preferably automatic, and may consist of a coil-spring 47, see Fig. 5, which is carried within the drum 39, one end of the spring being secured at 48 to a head of the drum 39, the other end being secured at 49 to a fixed inner drum 50 which is rigidly secured upon a fixed arbor or shaft 51. As the charts are wound onto the rollers the torsion in the drum spring 47 is increased. With this organization, it will be evident that when the clutch is open, the spring 47 will exert its force to rotate the drum 39 and wind the charts back onto the drum. At the same time, it will be evident that the rotation of the drum 39 will cause the backward rotation of the hub 17ᵃ, and the bevel gear wheels 19 and 20 will operate to effect the return of the indicating pointers 24 and 27 to their zero positions.

Any suitable means may be provided for opening the clutch by hand and for locking or detaining the clutch in its open position until the indicating mechanism has completed its return movement to the zero position. It is necessary, or at least advisable, to hold the clutch open in this way, because if the clutch is locked or detained in its open position, it then becomes unnecessary to manually hold the clutch open; in machines of large capacity, if this improvement were absent, it would necessitate the operator's pressing the clutch-opening button for a considerable time. This improvement in my machine renders it substantially proof against ignorance, that is to say, it does not require any intelligence on the part of the operator to return the mechanism accurately to zero, as it is simply necessary to press the thumb-plate which opens the clutch. If this is done, the clutch remains open automatically until the return movement is completed, and then closes again automatically.

In order to effect this result, I provide means for actuating the clutch-stem 10, see Fig. 5, said means comprising a hand-operated part such as the thumb-plate 52 formed at the end of a flat stem or sliding plate 53 which is supported and guided through a suitable guide slot 54 in the horizontal plate 55, see Fig. 8. The inner end of this flat stem 53 is attached to a lever 56, the edge of which lies against the clutch stem 10. Coöperating with these parts I provide a detent for holding the stem 10 in such a way that it will maintain the clutch open after the clutch has been opened. This is preferably accomplished by means of a detent coöperating with the lever 56, see Fig. 8. This detent may be in the form of a lever, latch or arm 59 having its fulcrum at 60 on an extension 61 extending down from frame plate 55. The end of the lever 56 has a claw 62, see Figs. 5 and 7, said claw terminating in an inwardly extending finger 63 having a notch 64 and a shoulder 65 adjacent to the notch. Now when the thumb-plate 52 is shoved inwardly, the shoulder 65 moves in past the vertical plane of movement of the arm or lever 59, and when this occurs, a spring 66 coöperating with the lever or arm 59 forces the arm outwardly in such a way as to catch it on the shoulder 65, see Fig. 7. In this way the shoulder 65 operates to prevent the lever 56 from returning to its normal position, and hence the clutch will be maintained open until the lever 59 is actuated to disengage it from the shoulder 65 and permit the lever 56 to swing outwardly under the action of the clutch-spring 14.

Any suitable means may be provided for actuating the lever 59 automatically about the time that the indicating mechanism has returned to its zero position. In order to accomplish this, and at the same time, to provide means for stopping the indicating mechanism at the zero position I employ a moving part of the indicating mechanism which moves in unison with the slow-moving pointer, as a controller or controlling means. For this purpose, I prefer to utilize the large gear wheel 31, and to this end, I provide its upper side with means such as a pin 67, see Figs. 4 and 6. Adjacent to the upper end of the lever 59 I provide a stop device including a spring pressed pawl 68 which is attached to a short vertical shaft 69 mounted in a suitable bracket 70, and the lower end of this shaft 69 carries a stop-pawl or dog 61, the point of which lies adjacent to the edge of the aforesaid stop wheel 28. Now when the indicating mechanism is arriving at its zero position, the pin 67 strikes the pawl 68 and this rotates the shaft 69 and rocks the dog 71 inwardly so that it comes into the path of a notch or shoulder 72 formed in the edge of the disk or stop wheel 28. In this way, the indicating mechanism actually stops itself at the zero position.

In order to enable the actuation of this shaft 69 to release the clutch, I prefer to form the pawl 71 so that it is simply a part of a plate 73, below which there is pivotally mounted on the shaft 69, a small plate or dog 74 which carries a pin 75, and this pin is held up against the edge of the plate 73 by a spring 76. The nose 74ᵃ of this plate lies adjacent to the upper end of the lever 59. With this organization, it is evident that when the shaft 69 is rocked, the plate 73 (which is rigid on shaft 69) will rock the plate 74, and the nose of the plate 74 will rotate the lever or detent 59 toward the left, thereby disengaging it from the shoulder 65. The clutch-spring 14 will then operate to force the lever 56 outwardly. The finger 63 keeps the lever 56 engaging the lever 59 and keeps the lever 56 in coöperative relation with the lever 59. This outward movement of lever 56 releases the clutch, that is to say, the clutch will then be closed by its spring 14.

After the desired length of fabric has been pulled through the machine, and the charts observed by the salesman, so that he will know the charge to be made for the goods sold, the operator of the machine marks the point at which the goods are to be detached from the roll or bolt. I shall now describe the marking means or cutter which I prefer to provide for this purpose.

Referring particularly to Fig. 1, I provide a movable lever 77 having a fixed fulcrum which may be formed by a pivot-stud 78 mounted in a fixed bracket-plate 79. This lever 77 carries a blade 80 which constitutes a movable blade to coöperate with a fixed blade 81. The lever 77 is provided with a rear extension or wing 82 on the side of the fulcrum that lies opposite to the blades 80 and 81, and adjacent to this wing 82 I provide a guide having a bearing face 83 across which the extension or wing moves. The function of this bearing face 83 is to operate as a guide to coöperate with the blades 80 and 81 when they co-act in their scissor-like relative movement which they simulate when in use. I provide means for yieldingly and resiliently pressing the movable blade toward the plane of the blade 81, and simultaneously pressing the extension 82 against the guide face 83. For this purpose, the pivot-stud 78 is preferably mounted loosely in a boss 84 on bracket-plate 79, and is secured to the lever 77 by a suitable nut 85 and washer 86. The yielding means is preferably in the form of a spring washer 87. This spring washer 87 may be held under an enlarged head 89 on the end of the stud, see Fig. 10.

With such an organization as this, it is evident that the extension 82 will coöperate with the movable blade and assist in guiding it as it is swung down, which is accomplished by means of the thumb-plate 90 carried on the outer end of the lever 77.

Referring to Fig. 9, it will be evident that the planes of the two blades 80 and 81 are tilted or inclined with respect to each other, and hence, as the engagement of the blades progresses, it may happen that the position of the lever 77 will become shifted, somewhat, by reason of a slight sliding movement of the pivot-stud 78. Evidently the spring-washer 87 will allow for any such shifting movement of the lever, but in any shifted position of the lever the bearing face 83 will always operate as a guide to assist in maintaining the effective co-action of the cutting edges of the blades. The blade lever 77 is normally held up by a suitable spring 91.

One of the novel features of my invention is the use of means in the form of a reduction gear in the drive for the pointer, which operates in such a way as to drive the pointer at a variable speed, reducing the speed of the pointer as it is passing the numbers on the dial. This is advantageous because it tends to increase the accuracy in reading the dial. This effect is preferably accomplished by means of reduction gearing such as that described which embodies an eccentric. This improvement can be used where there is only one pointer employed, in which case the pointer should be secured to its driving spindle over any one of the numbers of the dial when the axis of eccentricity of the eccentric is in line with the held point or guide post 36. If the pointer is attached in this way it will move slowly as it is passing each number on the scale. Where two pointers are employed, the fast-moving pointer should be secured to its driving spindle over the zero point when the other pointer is over any one of the members.

The mode of operation of the complete machine will now be briefly described:

The end of the piece of fabric to be measured is introduced in the gap 2 between the measuring roller 3 and the presser roller 4, and the presser roller 4 is then depressed by any well known means to hold the fabric against the face of the measuring roller. The fabric is then pulled through the throat or gap 2, and as it moves it rotates the measuring roller, and the rotation of the measuring roller is imparted through the pinion 6 and the clutch (composed of members 7 and 9) thereby driving the gear 17 from the pinion 16; the motion of the pinion 17 is imparted through the bevel gears 19 and 20, to the indicating pointers 24 and 27. The rotation of gear-wheel 17 is also imparted through gears 45 and 44 to the gears 43 (which are rigid with the rollers 40 and 41). In this way the motion is imparted to charts 38.

The fast-moving pointer 24 is driven in unison with the bevel gear 20 through the hollow spindle 21. The rotation of this spindle 21 also rotates the eccentric 29, which is loosely mounted in the small gear-wheel 30 (see Fig. 6). This gear-wheel 30 is held against rotation by post 36, (see Fig. 4) so that the rotation of the eccentric 29 operates to rotate the crown-gear 31 at reduced speed. The slow-moving pointer 27 is rigid with the crown-gear 31 and rotates in unison with it.

When it is desired to set the indicating mechanism back to the zero position, the operator merely shoves in thumb-plate 52

(see Fig. 5); this shoves in the clutch stem 10 and opens the clutch by moving the clutch member 9 away from the clutch-member 7. Opening the clutch in this way disconnects the drive from the measuring roller and eliminates the resistance of rotating the measuring roller, so that the spring 47 on the drum 39, rewinds charts 38 on the drum 39, and the energy of the spring 47 is also imparted through the gears 19 and 20 to rotate the hands or pointers 24 and 27 back to their zero position. Just about the time the pointers 24 and 27 are arriving at the zero position, the pin 67 on crown wheel 31 strikes the spring-pressed pawl 68 (see Figs. 4 and 8) and the rotation of this pawl is communicated through shaft 69 to a stop-pawl 71, and swings this stop-pawl 71 inwardly against the edge of stop-wheel 28, so that the pawl is in the path of shoulder 72 on this stop-wheel; when this shoulder reaches the stop-pawl as indicated in Fig. 8, the mechanism will be stopped in its zero position.

When the clutch is opened, it is held open automatically after the release of the thumb-plate 52 until the indicating mechanism has completed its return movement to the zero position. Referring to Figs. 5, 7 and 8, when the thumb-plate 52 is shoved in, the lever 56 is swung inwardly by the thumb-plate and when this occurs the spring 66 shoves the latch lever 59 outwardly on its pivot 60, so that its edge engages over the shoulder 65 on the finger 63; this holds the lever 56 against return and in this way holds the clutch open. When the shaft 69 is latched or locked in the manner described above, the plate 73, a part of which forms pawl 71, swings around so that the nose 74ᵃ of plate 74 moves the upper end of latch lever 59 toward the left, or inwardly; this will move the edge of the lever 59 away from the shoulder 65 and permit the clutch spring 14 to close the clutch. It is evident that with this organization of parts, it is only necessary for the operator to push in the thumb-plate 52; the thumb plate need not be held in until the indicating mechanism returns to zero, because it is held in automatically until the return movement is completed. When the return movement is completed, the latch 59 is released and the clutch closes automatically.

It is understood that the embodiment of the invention described herein is only one of the many embodiments my invention may take, and I do not wish to be limited in the practice of my invention, nor in my claims, to the particular embodiment set forth.

What I claim and desire to secure by Letters Patent is:

1. In a zero setting mechanism for cloth measuring machines, the combination of a clutch, means for closing said clutch, indicating mechanism driven through said clutch, a hand-actuated member for opening said clutch, means for returning the indicating mechanism to the zero position after the clutch is opened, and automatic means operating after release of the hand-actuated member for holding the clutch open until the indicating mechanism has completed its return movement to the zero position.

2. In a zero setting mechanism for cloth measuring machines, the combination of a clutch, means for closing said clutch, indicating mechanism driven through said clutch, a hand-actuated member for opening said clutch, means for returning the indicating mechanism to the zero position after the clutch is opened, a detent for holding the clutch open until the indicating mechanism has completed its return movement to the zero position, said indicating mechanism including a moving part for actuating said detent to release the clutch from the detent when the indicating mechanism has completed its return movement.

3. In a zero setting mechanism for cloth measuring machines, the combination of a clutch, indicating mechanism driven through said clutch, a hand-actuated member for opening said clutch, means for returning the indicating mechanism to the zero position after the clutch is opened, a spring for closing the clutch, said indicating mechanism including a dial and a rotatable pointer cooperating with said dial, a wheel rotating with said pointer, a detent for holding the clutch open until the indicating mechanism has completed its return movement to its zero position, and means for actuating said detent by said wheel to release the clutch to permit the same to close when the indicating mechanism has returned to its zero position.

4. In a zero setting mechanism for cloth measuring machines, the combination of a clutch, means for closing said clutch, indicating mechanism driven through said clutch, a hand-actuated member for opening said clutch, means for returning the indicating mechanism to the zero position after the clutch is opened, said indicating mechanism including a dial and a rotatable units pointer, driven so as to make one revolution in the greatest measuring movement of the machine, and a wheel revolving in unison with said units pointer, so as to make one revolution in the greatest measuring movement of the machine, a detent for holding the clutch open until the indicating mechanism has completed its return movement to the zero position, and means for actuating said detent by said wheel to release the clutch and permit the same to close after the indicating mechanism has returned to the zero position.

5. In a zero setting mechanism for cloth measuring machines, the combination of a clutch, means for closing said clutch, indicating mechanism driven through said clutch, a hand-actuated member for opening said clutch, means for returning the indicating mechanism to the zero position after the clutch is opened, said indicating mechanism including a dial, and a units pointer coöperating therewith, driven so as to make one revolution in the greatest measuring mvement of the machine, a stop-wheel, a controller wheel driven so as to make a single revolution when the indicating mechanism is driven to its greatest measuring capacity, a spring for closing the clutch, a detent for holding the clutch open until the indicating mechanism has completed its return movement to the zero position, means actuated by said controller wheel for releasing said detent when the indicating mechanism has completed its return movement, to permit the clutch to close, said last named means including a stop-pawl for engaging said stop-wheel to stop the indicating mechanism in its return movement at the zero position.

6. In a zero setting mechanism for cloth measuring machines, the combination of a clutch, means for normally holding the clutch closed, indicating mechanism driven through said clutch, a hand-actuated member for opening the clutch, automatic means for returning the indicating mechanism to the zero position when the clutch is open, a latch for automatically latching the clutch in its open position when opened by said hand-actuated member, said indicating mechanism including a part for actuating said latch to release the clutch and permit the same to close after the indicating mechanism has returned to its zero position.

7. In a zero setting mechanism for cloth measuring machines, the combination of a clutch, indicating mechanism driven through said clutch when said clutch is closed, a hand-actuated member for opening the clutch, means for normally holding the clutch closed, automatic means for returning the indicating mechanism to the zero position when the clutch is open, a latch coöperating with said hand-actuated member for holding the clutch open to permit the indicating mechanism to complete its return to the zero position, said indicating mechanism including a pointer for indicating units of measure, driven so as to make a single revolution in the greatest measuring movement of the machine, and a controller wheel revolving with said pointer, a pin on said wheel, and means actuated by said pin when said pointer arrives at its zero position for actuating said latch to release the clutch and permit the same to close.

8. In a zero setting mechanism for cloth measuring machines, the combination of a clutch, means for normally holding the clutch closed, indicating mechanism driven through said clutch, a stem mounted to slide on the axis of rotation of said clutch for opening the clutch, means for returning the indicating mechanism to the zero position after the clutch has been opened, a hand-operated lever for actuating said stem to open the clutch, a latch to engage said lever and hold the clutch in its open position until the indicating mechanism has completed its return movement to the zero position, and automatic means for actuating said latch when the indicating mechanism has substantially arrived at the zero position to release said clutch and permit the same to close.

9. In a zero setting mechanism for cloth measuring machines, the combination of a clutch, means for normally holding the clutch closed, indicating mechanism driven through said clutch, a stem mounted to slide on the axis of rotation of said clutch, for opening said clutch, a lever for actuating said stem to open said clutch, means for returning the indicating mechanism to the zero position after the clutch has been opened, a spring actuated latch for holding said lever in a position to hold the clutch open after the clutch has been opened, until said indicating mechanism has completed its return movement to the zero position, and automatic means for actuating said latch when the indicating mechanism has substantially arrived at the zero position to release the clutch and permit the same to close.

In testimony whereof I have hereunto set my hand.

JOHN L. WHEELER.